United States Patent [19]

Eichenlaub

[11] 4,367,486

[45] Jan. 4, 1983

[54] THREE DIMENSIONAL IMAGING SYSTEM

[75] Inventor: Jesse B. Eichenlaub, 100 9th St., Troy, N.Y. 12180

[73] Assignees: Jesse B. Eichenlaub; Roberta H. Wessendorf, both of Troy, N.Y.

[21] Appl. No.: 131,415

[22] Filed: Mar. 18, 1980

[51] Int. Cl.[3] .............................................. H04N 9/54
[52] U.S. Cl. ...................................... 358/88; 358/89; 358/91
[58] Field of Search ................... 358/89, 90, 202, 203, 358/204, 230, 236, 209, 217, 91, 92, 88, 111, 113

[56] References Cited

U.S. PATENT DOCUMENTS

| | | | |
|---|---|---|---|
| 2,201,069 | 5/1940 | Wolff | 358/217 |
| 3,046,330 | 7/1962 | Ross | 358/91 |
| 3,076,054 | 1/1963 | Simon | 358/88 |
| 3,144,511 | 8/1964 | Bouwers | 358/202 |
| 3,334,179 | 8/1967 | Winnek | 358/92 |
| 3,444,316 | 5/1969 | Gerritsen | 358/90 |
| 3,516,721 | 6/1970 | Collier et al. | 358/90 |
| 3,666,881 | 5/1972 | Stein | 358/230 |

FOREIGN PATENT DOCUMENTS

1066418 10/1959 Fed. Rep. of Germany ........ 358/88

*Primary Examiner*—Joseph A. Orsino, Jr.
*Attorney, Agent, or Firm*—Walter F. Wessendorf, Jr.

[57] ABSTRACT

Reflected illuminating radiation is transmitted through a restricted window in an opaque surface undergoing scanning movement to project an image pattern on a closely spaced imaging surface from which the image pattern is reproduced on a viewing screen. The viewing screen is locally variable in transparency to provide images of objects viewed by observers with parallax.

10 Claims, 17 Drawing Figures

THREE DIMENSIONAL IMAGING SYSTEM

BACKGROUND OF THE INVENTION

This invention relates to image reproducing systems which impart a three dimensional character to the image being viewed.

Three dimensional imaging and display systems have found practical use in computer graphics, simulation, diagnostic medicine, mapping and undersea operations. Potential use of three dimensional imaging and display in air traffic control and television is also under consideration. Such systems utilize optical techniques to produce images that appear three dimensional to the observer because of parallax. The optical techniques as presently known fall into four basic categories, consisting of binocular stereoscopy, volume scanning, holography, and geometrical optics.

The foregoing optical techniques suffer from different disadvantages such as the required use of special glasses, observation from a fixed location, use of a rapidly moving screen or lens, formation of transparent images only, required use of coherent monochromatic light, and extremely expensive fine grained viewing screens.

The aforementioned class of geometrical optics involves the use of ray optics in which the color and intensity of a ray pattern is reproduced as a function of the path of incidence of the rays impinging on a camera surface. Generally, many extremely small flat images projected through a corresponding number of small lenses are utilized in an image reproduction process, known as integral photography in this type of three dimensional imaging and display technique. Lenticular cylindrical lenses or fly's eye lenses and associated high-resolution CRT's thus utilized are expensive. It is therefore an important object of the present invention to provide a three dimensional imaging and display system of the geometric optics type which avoids the aforementioned disadvantages and drawbacks. In particular, it is an object of the present invention to avoid use of integral photography and the expense of lenses associated therewith and yet produce images capable of being observed with parallax.

An additional object of the present invention is to provide an optical system for use in three dimensional real time imaging and display involving the use of any type of radiation, coherent or non-coherent, as a source of illumination including acoustical waves, electrons and most of the electromagnetic spectrum.

Yet another object of the present invention is to provide a three dimensional display system which allows viewers to observe three dimensional images in natural color and without the use of special glasses.

SUMMARY OF THE INVENTION

In accordance with the present invention, a radiation detecting camera is modified by use of a radiation blocking element such as an opaque surface placed in front of the camera having a small radiation transmissive or transparent window formed therein which is caused to undergo scanning movement similar to that associated with a television camera. At any given instant, radiation transmitted through the window impinges upon a second imaging surface associated with the camera such as a vidicon device spaced behind the opaque surface and parallel thereto. Images formed on the imaging surface in this manner are transmitted electronically in real time to a receiver. The receiver associated with the present invention includes display devices such as a cathode ray tube (CRT) having a display surface substantially equal in area to the opaque surface associated with the camera. Spaced parallel to the display surface is a screen having a variable transmissivity or transparency. This viewing screen is dimensioned equal to that of the imaging surface associated with the camera. A point of light emitted from the display surface, moves in synchronism with the scanning motion of the transparent window in the opaque surface, and impinges on the viewing screen. At any instant, the radiation emitted from the display surface modulates the transparency of a corresponding point on the viewing screen in proportion to the intensity of the light reaching the imaging surface associated with the camera. Thus, at any instant, the ray pattern on the imaging surface at the camera site which will have an intensity that is a function of the angle of incidence is reproduced on the viewing screen by virtue of the corresponding local modulation of its transparency. As the transparent window in the opaque surface undergoes movement, a complete ray pattern is built up to produce an image that is reproduced by the viewing screen in such a fashion so as to enable a viewer to observe the image with parallax.

BRIEF DESCRIPTION OF THE DRAWING FIGURES

FIG. 9b is a perspective view illustrating a modification of the receiver system shown in FIG. 3 for use with a distortion correcting camera arrangement, as shown in FIGS. 8 and 9a FIG. 10 is a perspective diagram illustrating the geometry associated with the components illustrated in FIG. 9a;

FIG. 11 is a perspective view of the components associated with the receiver in a system of the type shown in FIGS. 8 and 9a;

DETAILED DESCRIPTION OF PREFERRED EMBODIMENTS

Figure 1:
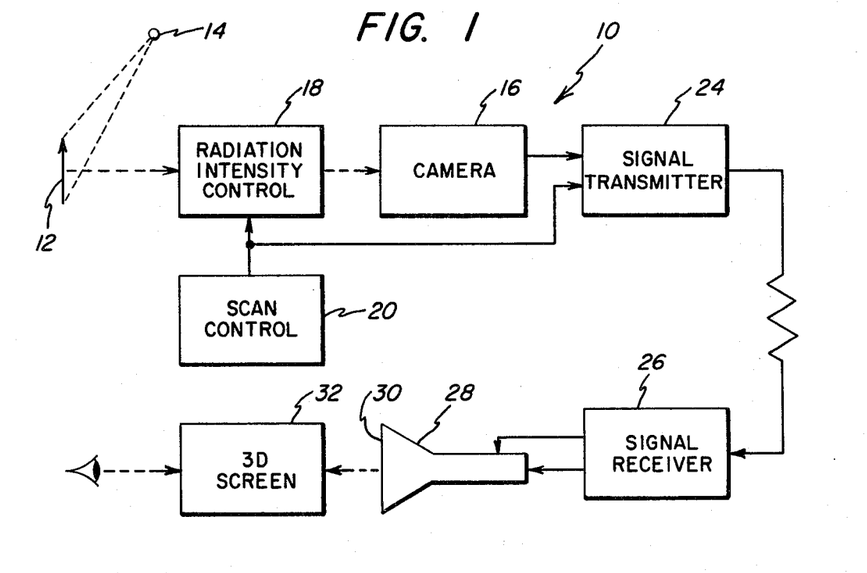
FIG. 1 is a schematic block diagram illustrating the system of the present invention in accordance with one embodiment.

Referring now to the drawings in detail, FIG. 1 schematically illustrates an image reproducing system generally denoted by reference numeral 10. An object 12 illuminated by a source of radiation 14, reflects the radiation which is detected by a camera 16 from which an image of the object is derived. The radiation entering the camera 16 passes through a radiation intensity control component 18 by means of which a three dimensional character is imparted to the image. The component 18 is rendered operative to produce the image by a scan control 20 in accordance with the present invention. The radiation pattern producing the image is converted into signal energy by the camera for transmission by a transmitter 24 to a signal receiver 26. A signal from the scan control 20 is also transmitted by the transmitter to the receiver 26 so that the image and scanning signals may be fed by the receiver 26 to a display device generally referred to by reference numeral 28, having a display surface 30 and a screen 32 of locally variable transparency which together reproduce an image with parallax. The three dimensional or parallax nature of the reproduced image results from the variation imposed by component 18 on the intensity of the radiation detected by the camera 16 as a function of the angle of incidence, this variable radiation intensity pattern being reproduced by the display surfaces 30 and 32 in synchronism with the scanning signals applied to the component 18 by the scan control 20.

Figure 2:
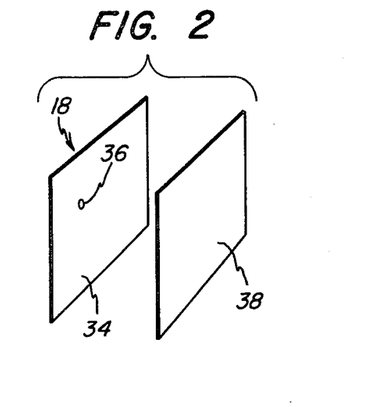
FIG. 2 is a perspective view of the basic components associated with the radiation intensity control for the camera of the system.

FIG. 2 illustrates the basic make-up of the component 18 associated with the camera in accordance with one embodiment of the invention. Component 18 includes a radiation blocking or non-transmissive element such as an opaque surfaced panel 34 positioned in front of the camera so as to block radiation being detected at any given instant except for the radiation impinging on a transparent window in the form of a pinhole aperture 36. The location of the pinhole aperture moves in the plane of the opaque surface 34 under control of the scan control 20 in a horizontal and vertical scanning pattern characteristic of a television raster scan pattern. Thus the standard television scan speed of one frame per one-thirtieth of a second may be utilized for control of the scanning movement of the aperture 36. Movement of the aperture itself may be accomplished in various ways known to persons skilled in the art including electro-optical means utilizing a matrix of small optical shutters which are opened and closed in rapid succession, acousti-optical means or other non-mechanical means which utilizes a matrix for varying transparency. Scanning movement could also be accomplished mechanically. The details of the scanning movement method or apparatus form no part of the present invention. A disclosure of such methods or apparatus which impart or appear to impart movement to the transparent aperture in a plane surface, are disclosed for example, in U.S. Pat. No. 3,046,330 and 3,641,264.

The component 18 associated with the camera 16 also includes an imaging surface 38, as depicted in FIG. 2, spaced a predetermined distance from and parallel to the opaque surface 34. An image formed by the radiation transmitted through the pinhole aperture 36 on the imaging surface 38 will be characterized by a radiation intensity that is a function of the angle of incidence of the radiation impinging on the pinhole aperture 36 in order to impart a three dimensional characteristic to the image. The radiation impinging on the imaging surface 38 is converted into signal energy by the camera, which may, for example, be a Vidicon device for conversion of the radiation into TV signals. Other types of TV cameras could also be utilized. For non-real time uses, the imaging surface 38 would be a movie film. Where the radiation on the imaging surface is converted into electronic signals, such conversion must occur very rapidly at a rate high enough so that the pinhole aperture 36 need only move a very short distance during each image frame. If electro-optical shutters are utilized to obtain movement of the pinhole aperture, scanning motion would be fast enough so that one scan is completed during the time that any one shutter is opened.

Figure 3:
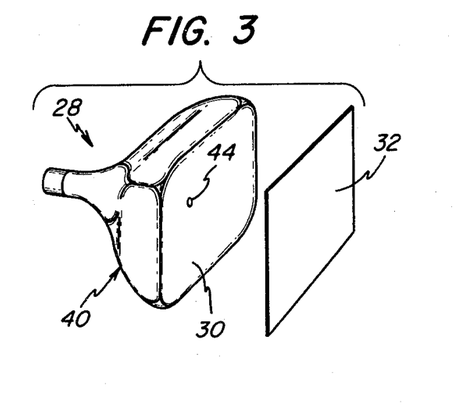
FIG. 3 is a perspective view illustrating the basic components associated with the receiver in the system of the present invention.

FIG. 3 shows portions of the display device 28 referred to in connection with FIG. 1, in accordance with an embodiment of the invention in which the receiver is of the TV type. The display device includes a cathode ray tube type of device (CRT) 40, or equivalent device, to which radiation emitting and scanning signals are applied in a manner well known in the art, for producing an image pattern on its display surface 30. The surface 30 may be equal in size and shape to the opaque surface 34 associated with the camera. Thus, a moving point of emission 44 is produced on surface 30 that scans across the surface in the same pattern as the pinhole aperture 36 and at the same speed and in the same direction. Such synchronization is effected by means of the scanning signals originating with the scan control 20. Positioned in parallel spaced relation to surface 30 of the CRT 40 is the viewing screen 32 that is locally variable in transparency. Screens of this type are well known in the art, as developed for real time reproduction of interference patterns or holograms. Other screen arrangements that may be utilized including those made up of a plurality of individual liquid crystals, pockel cells or similar electro-optical devices. The electronic circuitry associated with such screens would be similar to those used for flat screen TV receivers. The screen 32 may be made equal in size and shape to the imaging surface 38 associated with the camera and is positioned parallel to the surface 30 at a distance therefrom equal to the distance between opaque surface 34 and imaging surface 38. The transparency of the screen 32 at any point on its surface, at any instant of time, is proportional to the intensity of the radiation falling on the corresponding point on the surface 38 of the camera. Accordingly, at any instant, a cone of radiation having a certain intensity versus ray function angle, arrives at the pinhole aperture 36 and impinges on the imaging surface 38 for reproduction by the screen 32 in a geometrically and positionally congruent manner. The cone of light coming from the emission point 44 is modified in intensity when passing through screen 32, in a manner such that, after passing through screen 32, it has the same intensity versus ray angle function as the cone arriving at pinhole aperture 36. Thus, to the observer, viewing the screen 32, the screen will appear to be a window located at the camera site where the opaque surface 34 is located. By scanning the object in red, blue and green at the camera site, in synchronism with the scanning of red, blue and green points of lights across the surface 30 of the CRT 40, image reproduction in color may be effected. Color reproduction may also be effected through liquid crystals as described in U.S. Pat. No. 3,703,329 wherein the screen 32 would be made of liquid crystals capable of modulating the color as well as radiation intensity. Where the screen itself is utilized to obtain color reproduction, only a white point of light is reproduced on the surface 30 of the CRT 40.

The best mode of practicing the invention as presently contemplated utilizes pinhole optics at the camera location of the system. However, lenses could be utilized, where appropriate, to reduce the size of the camera. U.S. Pat. No. 3,046,330 to Ross aforementioned, discloses some visual light cameras having lenses which operate or principles suitable for such use with the present invention. However, it should be appreciated that the use of larger apertures in accordance with such embodiments of the invention leads to distortion as discussed in the Ross Patent. Accordingly, the pinhole aperture utilized for the camera of the present invention should be kept as small as possible. Where light is the illuminating radiation, image resolution will decrease with a decreasing aperture size. The lower limit for the size of the pinhole aperture 36 and the distance between the opaque and imaging surfaces will therefore be determined by the desired resolution. To obtain angular resolution equal to that of the human eye, a pinhole aperture of millimeter diameter must be utilized. This dimension is the size of an average human pupil in daylight. When utilizing radiation of shorter wave length than light however, it is possible to use much smaller apertures and yet achieve the same resolution.

Figure 4:
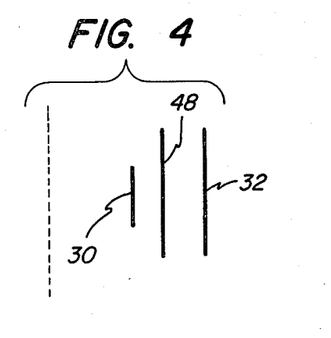
FIG. 4 is a side view showing a modification of the arrangement shown in FIG. 2.

In connection with the reproduction of light images through the display device 28, lenses may be also utilized for size reduction purposes. A size reduction lens system is depicted in FIG. 4 showing a thin fresnel or a hologram lens 48 positioned between the display surface 30 and the locally variable transparent viewing screen 32.

It is often desirable to reduce the amount of information that must be transmitted to a display device through which three dimensional images are reproduced, inasmuch as the amount of information required for such purposes is large as compared to two dimensional reproduction. One method of reducing the quantity of information necessary, is to form images that show parallax only in a horizontal direction. Such less than perfect three dimensional image reproduction may be acceptable inasmuch as peoples' eyes are displaced only horizontally while standing or sitting in front of the display device of a receiver. The reduction in information involved in the foregoing arrangement may be quantified as a factor N, where N is equal to the resolution in lines per frame height of a corresponding full three dimensional image of equal resolution. It should, however, be appreciated that the horizontal parallax type of image reproduction involves distortion as will be explained with reference to FIGS. 5a, 5b, 6a, 6b, 7a and 7b.

Figure 5A:
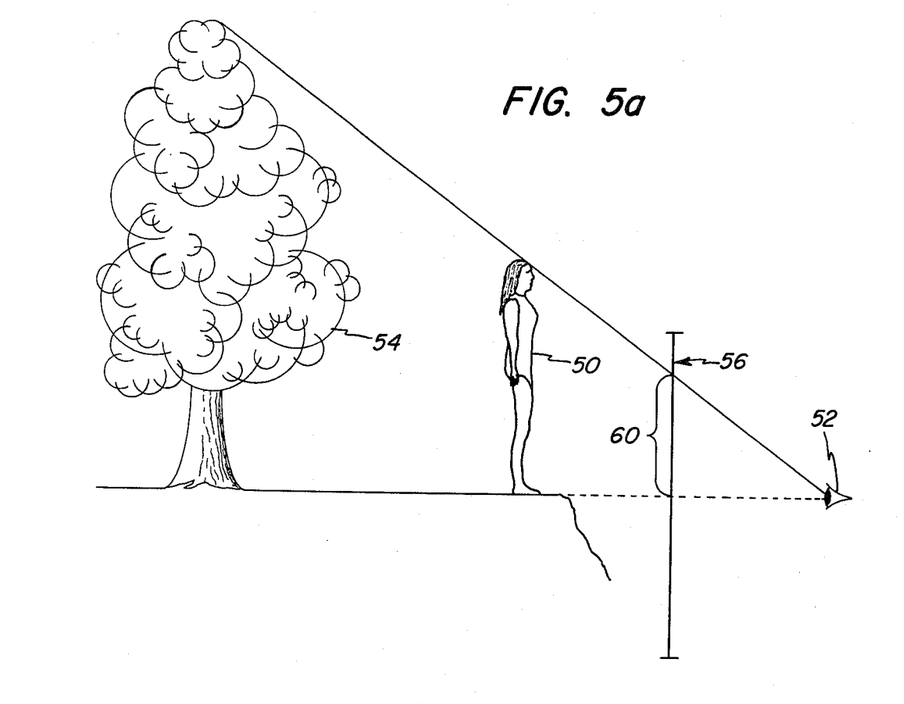
FIGS. 5a and 5b are side and top elevation views illustrating image distortion with respect to systems having horizontal parallax only.
Figure 5B:
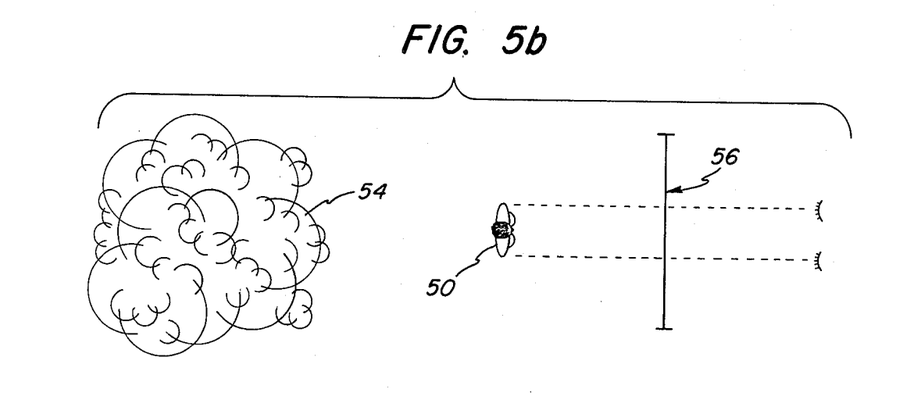

FIG. 5a is a side view of an image 50 as viewed from a location 52 in relation to a larger image 54 such as a tree. The images 50 and 54 are viewed through an optical device 56 utilizing a cylindrical or hologram lens of the type described in U.S. Pat. No. 3,643,017 to provide horizontal parallax. The image 50 is shown to be twice as far from the observer location 52 as the device 56 while the image of the image 54 is twice as far from the observer 52 as the image 50. The height of the image 54 also appears to be twice as high as the image 50. FIGS. 5a and 5b thus show a scene as it would appear to the observer at 52 in real life. Now with reference to FIGS. 6a and 6b, the observer moves rearwardly to a location 58 which is three times further from device 56 than location 52. The new location 58 is also twice as far from the image 50.

Figure 6A:
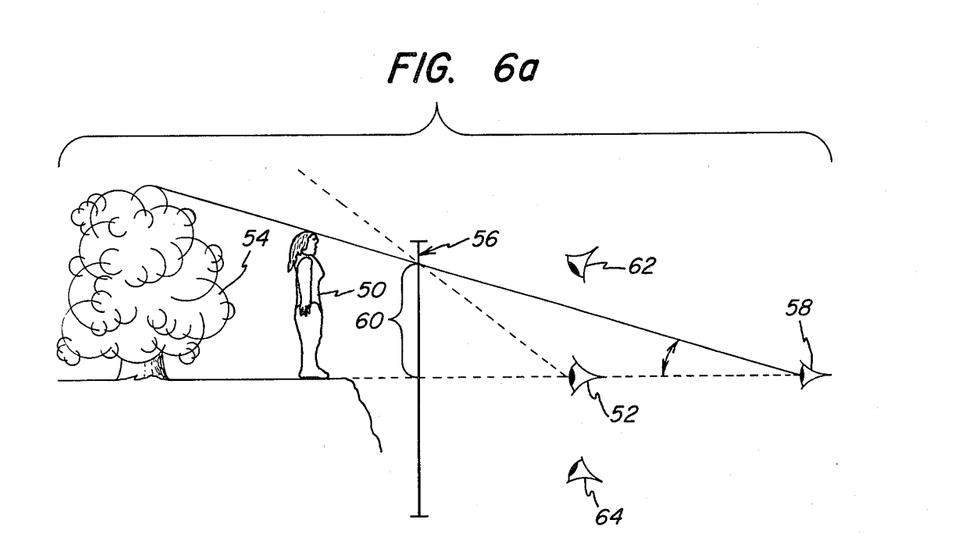
FIGS. 6a and 6b are side and top plan views illustrating distortion occurring in horizontal parallax systems at different locations of the observer.
Figure 6B:
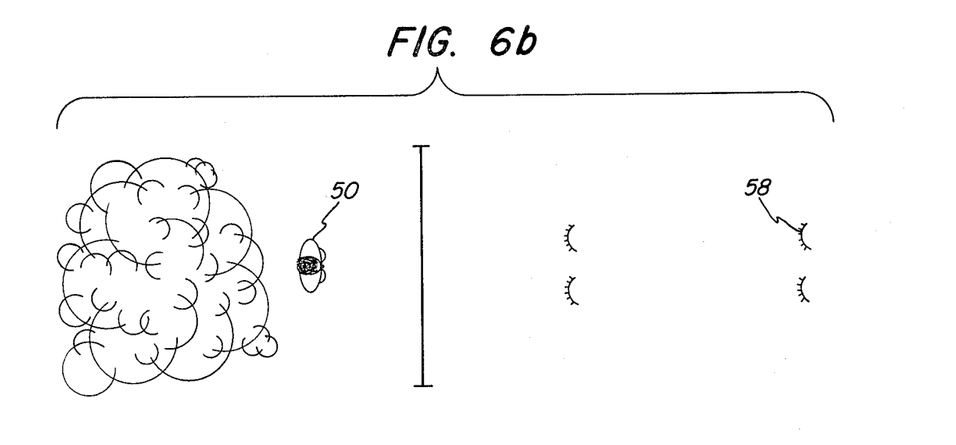

Inasmuch as the device 56 provides no three dimensional effects in the vertical direction, the images 50 and 54 appear to subtend the same angle height 60 at the device 56 corresponding to the height of the flat images 50 and 54 on the device 56 from which the three dimensional images are made. Such flat images will therefore appear to be one-third of their former angular height. Inasmuch as the device 56 provides parallax in the horizontal direction, the image 50 will subtend one-half its former horizontal angle while the image 54 will subtend about two-thirds of its former horizontal angle when viewed from location 58. Since the images 50 and 54 will be subtended by the correct horizontal angles when viewed from location 58, they will appear to be short and squat. The opposite effect is obtained when the observer moves closer to the device 56 from the original location at 52, so that the images 50 and 54 will then appear to be tall and thin. Thus, it should be appreciated that the relative sizes of the two images 50 and 54 will appear to be different for viewers at different distances from device 56. Observers at locations 62 and 64 in FIG. 6a will observe the images tilted up or down, respectively, bacause of a lack of vertical parallax.

Figure 8:
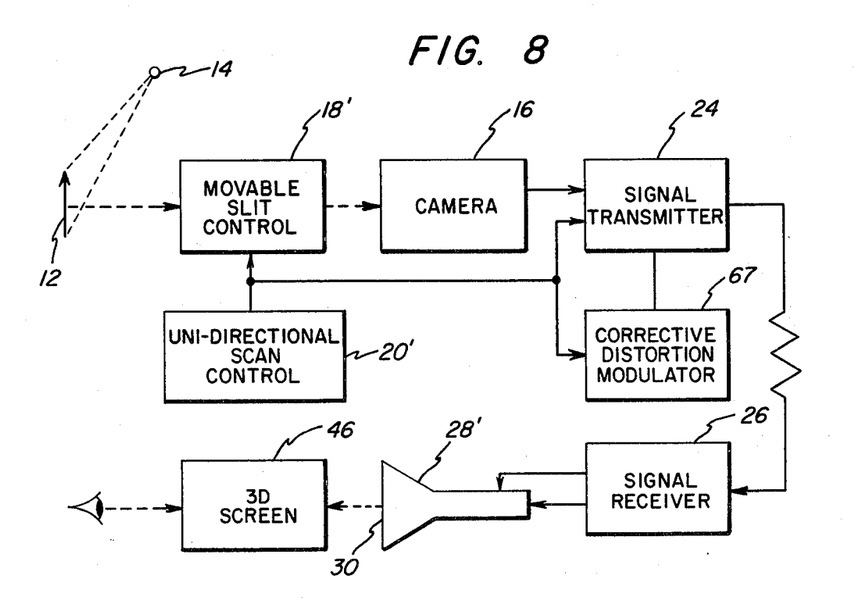
FIG. 8 is a schematic block diagram illustrating a system in accordance with another embodiment of the invention through which an image having horizontal parallax only is produced.
Figure 9A:
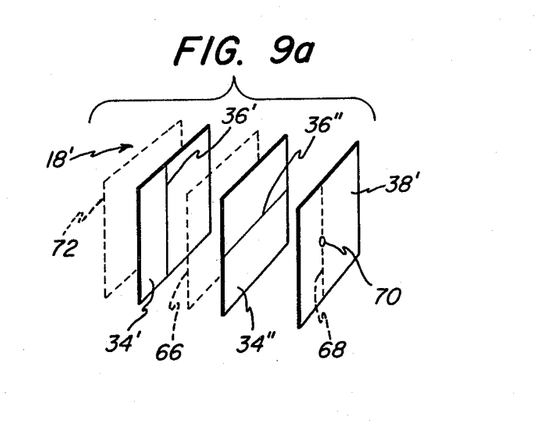
FIG. 9a is a perspective view illustrating the components associated with a camera in a system as shown in FIG. 8 producing images with horizontal parallax only.

It will therefore become apparent that the camera configuration is important in determining the best viewing locations and that it is possible to provide configurations that will give perfectly proportional images when viewed anywhere along some horizontal line rearwardly of the display device associated with the receiver. Also, with simple lens arrangements, the tilt distortion referred to in connection with FIG. 6a may be corrected. FIG. 8 depicts a distortion corrected system in accordance with another embodiment of the present invention wherein parallax is obtained in only the horizontal direction by an intensity control component 18' including an opaque surface 34' provided with a transparent window in the form of a thin vertical slit 36' as shown in FIG. 9a. The slit 36' elongated in a vertical direction, is caused to move in a horizontal direction across the front of the camera in the plane of surface 34'. Such motion may be controlled by a scanning control component 20' as shown in FIG. 8. The component 18' as shown in FIG. 9a also includes a second opaque surface 34" positioned in parallel spaced relationship to opaque surface 34' and bisected by a thin transparent and horizontal slit 36". The slit 36" is stationary. An imaging surface 38' is positioned in parallel spaced relationship to the opaque surface 34". As hereinbefore indicated with respect to the imaging surface 38 in FIG. 2, the imaging surface 38' may be associated with a Vidicon or equivalent device.

For reasons to be apparent hereinafter, FIG. 9a shows an imaginary plane 66 through which radiation passes before it passes through slit 36" and onto image plane 38'. FIG. 9a also shows an imaginary line 68. The imaginary line 68 will always be aligned with the moving vertical slit 36'. An imaginary plane 72 shown in FIG. 9a limits the distortion correcting geometry to be hereinafter described.

Figure 9B:
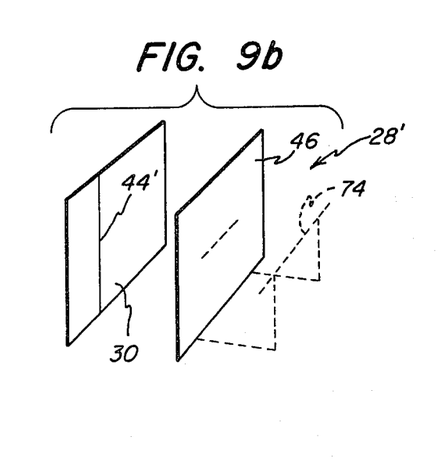

FIG. 9b illustrates a portion of a modified form of a display device 28' for use with the distortion correcting camera arrangement depicted in FIGS. 8 and 9a. The arrangement shown in FIG. 9b corresponds to that of FIG. 3 except that the radiation emitting surface 30 of the CRT emits radiation from a vertical line 44' that undergoes horizontal scanning movement in synchronization with scanning movement of slit 36' as shown in FIG. 9a. Positioned in parallel spaced relation to CRT surface 30, is a locally variable transparency screen 46 on which images are displaced after undergoing suitable corrective distortion. The spacing between surface 30 and imaginary line 74 is the same as the spacing between surfaces 34' and 34'' associated with the camera. An observer viewing the screen 46 will see no distortion from a viewing site on horizontal line 74. Screen 46 is the same distance from display 30 as imaginary plane 66 is from opaque screen 34' of the camera. Thus, the intensity versus ray angle function of the light impinging on the second opaque surface 34'' along the stationary horizontal slit 36'', is recreated on the line 74 by reproducing on the screen 46 a corresponding transparency of the image proportional in intensity, at a corresponding location on imaginary plane 66, to those rays which pass through the vertical slit 36''.

Figure 10:
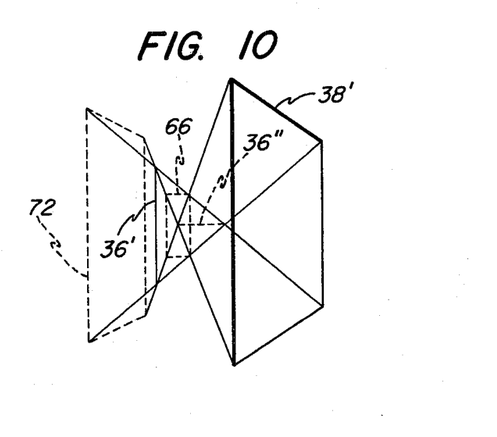

FIG. 10 shows the geometry necessary to effect the aforementioned corrective distortion. First, the image falling on surface 38' is inverted vertically and then contracted by a factor F of its original width toward imaginary line 68 (shown in FIG. 9a) on the imaging surface 38'. The image is also contracted by a factor F' of its original height. The factors F and F' are such that the image is made to fit the same space as that occupied by the section of plane 66 as shown in FIG. 10. The necessary image inversion and distortions may be formed electronically through a modulator 67 as shown in FIG. 8 before the image signals are sent to the receiver 26. Thus, a proper transparent image will be displayed on screen 46 with the rays reaching line 74 having the same intensity, for any given position and angle, as the rays that impinge on the horizontal slit 36''. A complete image pattern is built up as the vertical slit 36' moves in a scanning motion across surface 34'. Observers that are not located at the limited viewing site along line 74 as shown in FIG. 9b, will observe the same type of distortion hereinbefore mentioned in connection with FIGS. 5a through 6b.

Figure 7A:
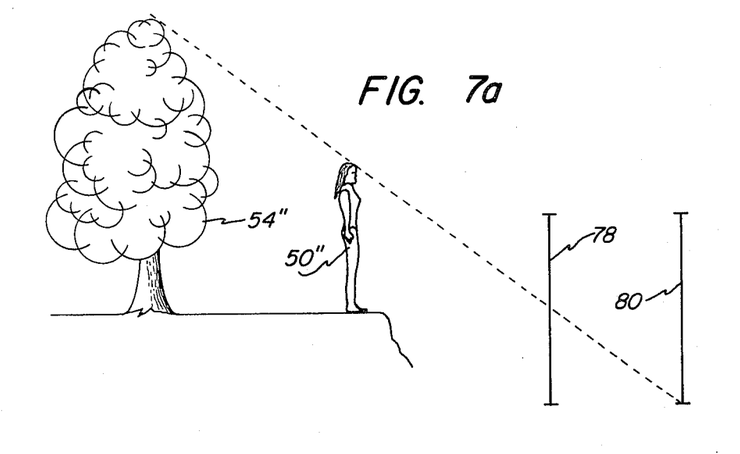
FIG. 7a is a side elevation view corresponding to an optical system in accordance with another embodiment of the invention.
Figure 7B:
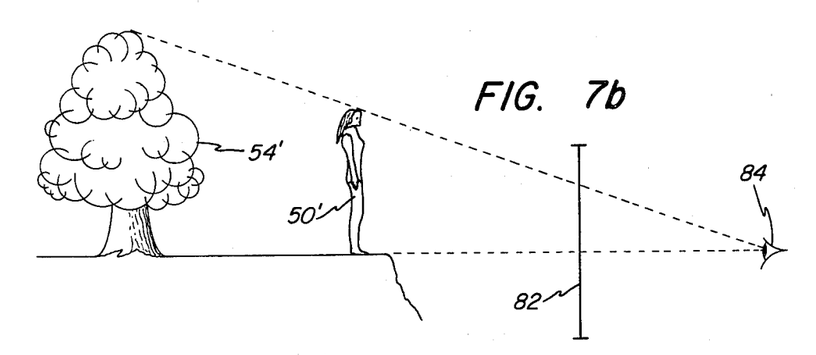
FIG. 7b is a side elevation view corresponding to an optical system associated with yet another embodiment of the invention.

It is also possible to utilize a horizontally scanning pinhole aperture type of system, instead of one having a horizontal scanning, vertical slit type aperture. FIGS. 7a and 7b illustrate the type of height distortion which results from a horizontal scanning, pinhole aperture type of arrangement. The objects 50'' in FIG. 7a are positioned in front of a camera having a pinhole that scans horizontally along the center line of otherwise opaque plane 78, behind which a parallel spaced imaging plane 80 is located. The images formed on the plane 80 are transmitted to the display device associated with the receiver. At the receiver, the image appearing on a viewing screen 82 will be observed at a location 84 so that the object image 50' appears to be the right height while the object image 54' will appear to be too short. The image of one object or the other will always appear to be out of proportion. However, there will not be any horizontal distortion.

In lieu of a stationary horizontal slit 36'' as hereinbefore described with respect to FIG. 9a, the present invention contemplates utilizing a wide horizontal cylindrical lens placed with its optical center on the plane of surface 34''. The cylindrical lens will be curved by the proper amount in the vertical direction so that it will focus on the imaging plane 38'.

Figure 11:
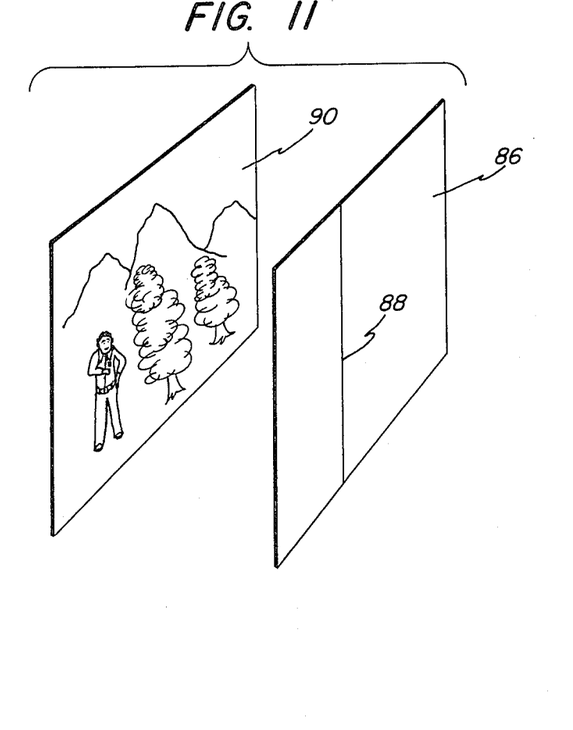

FIG. 11 illustrates another embodiment of a display device at the receiver for use with a camera having associated therewith the control component 18' as shown in FIG. 9a. In FIG. 11, an opaque surface 86 is placed in front of the display surface 90 of a CRT and is provided with a vertical transparent slit 88. A horizontal scanning movement is imparted to the slit 88 in synchronism with the scanning movement imparted to the slit 36' (that is shown in FIG. 9a) at the camera site. Images produced on the imaging surface 38' at the camera site are displayed on the CRT after vertical inversion and with suitable distortions necessary to make the image the same size and shape as the section of plane 72 shown in FIG. 10. The opaque surface 86 at the receiver end, is at a distance from the display surface 90 equal to the distance between the plane 72 and the opaque surface 34' at the camera site. Appropriate image distortion involves inverting the images about point 70 on vertical line 68 at the same height as the horizontal slit 36''. The images are then expanded by the proper amount so as to assume the same size and shape as the intersection formed by plane 72 as viewed in FIG. 10.

The arrangement shown in FIG. 11 has the disadvantage that the slit 88 transmits only a small fraction of the light from the display surface 90 of the CRT. Hence, a very bright operating CRT must be utilized. However, it is possible to construct a relatively simple scanning slit device for use in front of a CRT in order to form a three dimensional TV receiver in accordance with the present invention.

Figure 12:
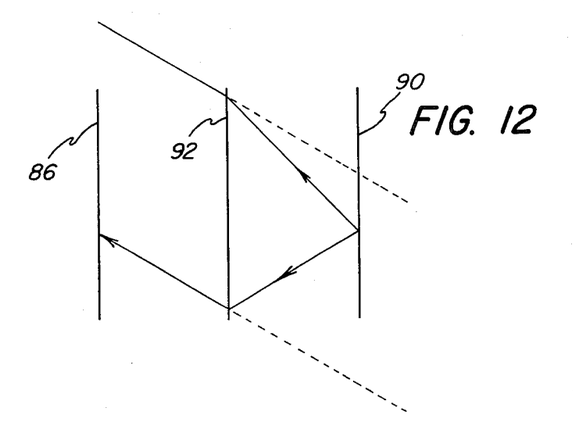
FIG. 12 is an optical diagram showing a modification of the receiver arrangement illustrated in FIG. 11.

FIG. 12 illustrates a method of obtaining distortion-free viewing of screen 86 placed in front of the display surface 90 of the CRT as described with respect to FIG. 11. A lens 92 is placed between the CRT surface 90 and screen 86. The lens 92 bends light only in a vertical direction and may be in the form of a cylindrical lens or flat fresnel lens of suitable configuration. The lens is placed with its vertical focus at surface 90 so that this surface appears to be at infinity insofar as parallax in the vertical direction is concerned. Images of scenes will not appear upwardly or downwardly tilted as the viewer moves in a vertical direction. The images will instead appear to move vertically with the viewer leaving the images unchanged.

For large display surfaces accommodating a large number of viewers, the CRT may be replaced by white screens upon which moving points or lines of light are projected, or by TV screens of the flat type.

Figure 13:
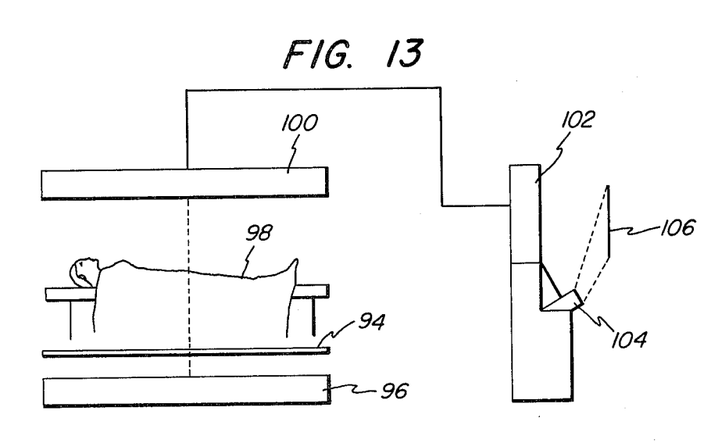
FIG. 13 is a schematic illustration of another application of the system of the present invention to x-ray diagnosis.

FIG. 13 illustrates a system employing the present invention wherein the illuminating radiation is x-rays. A scanning pinhole aperture device 94 similar to that hereinbefore described, is placed above an x-ray source 96 while a patient or other object 98 is placed above device 94 and below an image receiving surface 100. The images on surface 100 are converted into signals transmitted to a receiver 102 to produce three dimensional x-ray photographs. The receiver 102 could involve the use of a scanning point of coherent light from a Laser source 104. Film plate 106 may be placed in front of the receiver and illuminated by a portion of the beam from the Laser source 104 to form a hologram.

Having thusly described my invention, I claim:

1. A method of reproducing three-dimensional images of an object illuminated by or emitting any of the types of radiation known as x-rays, ultraviolet, visible light, infared, microwaves, particle radiation, inluding the steps of:
   exposing a radiation blocking element to said radiation;
   establishing a pinhole window in said element through which the radiation is restrictively transmitted onto an imaging surface in a non-focused manner to form a complete image having an intensity pattern dependent on window position;
   imparting scanning movement to said window to produce a series of complete images of said object on the imaging surface of different intensity patterns;
   converting the image-forming radiation impinging on the imaging surface into signal energy;
   converting said signal energy into a transparent image on a viewing screen that is locally variable in transmissivity;
   emitting radiation from a movable emission location on a display surface spaced behind said viewing screen;
   directing said radiation from said movable emission location to said viewing screen; and
   imparting movement to the emission location on said display surface in synchronism with said predetermined scanning movement of the window in said radiation blocking element to reproduce an image of said object on said viewing screen that is observed with parallax.

2. The method of claim 1 wherein said pinhole window is a pinhole aperture movable in perpendicular scanning directions.

3. The method of claim 1 wherein said signal energy is electrical and is transmitted to a remote receiving location by modulation of an electromagnetic signal.

4. The method of claim 1 wherein said imaging surface and the viewing screen are respectively parallel to said radiation blocking element and display surface.

5. The method of claim 4 wherein the spacing between said window and display surface is equal to the spacing between said viewing screen and imaging surface.

6. The method of claim 1 wherein said window established is a slit elongated in one direction and movable in a scanning direction perpendicular to said one direction.

7. The method of claim 6 wherein corrective distortion is performed on said scanned image in both said directions to effect corrective distortion of the image reproduced on said viewing screen establishing distortion-free viewing of said reproduced image with parallax from a limited viewing site fixedly spaced from said viewing screen.

8. The method of claim 7 wherein said scanned image is produced on said imaging surface by restricting transmission of the radiation from said window to a stationary slit elongated in a direction parallel to the scanning direction and located between said radiation blocking element and imaging surface, said stationary slit being spaced from said radiation blocking element and from said imaging surface.

9. A method of reproducing images of an object illuminated by or emitting any of the types of radiation known as x-rays, ultraviolet, visible light, infared, microwaves, particle radiation, for three-dimensional perception purposes, including the steps of:
   exposing a radiation blocking element to said radiation;
   establishing a pinhole window in said element through which the radiation is restrictively transmitted image-wise onto an imaging surface in a non-focused manner with an intensity pattern dependent on the location of the window;
   imparting a predetermined scanning movement to said pinhole window to produce a series of complete images on the imaging surface with different intensity patterns;
   converting the image-forming radiation impinging on the imaging surface into signal energy;
   converting said signal energy into an image on a display surface; and
   directing radiation from said image on the display surface through a second window in an image blocking element, said second window undergoing scanning movement in synchronism with said pinhole window.

10. For use with a camera detecting illumination by or emitting any of the types of radiation known as x-rays, ultraviolet, visible light, infared, microwaves, particle radiation, reflected from an object for three dimensional image perception of said object in response to a scanning operation, a device for imparting a three dimensional character to the image produced by the camera including a radiation blocking element spaced in front of the camera having a pinhole window through which the radiation enters the camera with an intensity that is a function of the angle of incidence at an instantaneous location of the window, an imaging surface onto which the radiation transmitted through said window in a non-focused manner is received to form a complete image of the object, said imaging surface being located in parallel spaced relation to said element, means for changing the location of said window in accordance with the scanning operation of the camera to vary the intensity pattern of the radiation forming said complete image as a function of the window location, a receiver operatively connected to the camera having a display surface from which radiation is emitted at a location corresponding to said location of said window, and a viewing screen spaced from said display surface to receive said radiation emitted therefrom, said viewing screen having a locally variable transmissivity.

* * * * *